United States Patent
Baldemair et al.

(10) Patent No.: US 8,649,417 B2
(45) Date of Patent: Feb. 11, 2014

(54) METHOD AND ARRANGEMENT IN A COMMUNICATION SYSTEM

(75) Inventors: Robert Baldemair, Solna (SE); Peter Larsson, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 310 days.

(21) Appl. No.: 13/128,954

(22) PCT Filed: Nov. 14, 2008

(86) PCT No.: PCT/SE2008/051308
§ 371 (c)(1),
(2), (4) Date: May 12, 2011

(87) PCT Pub. No.: WO2010/056165
PCT Pub. Date: May 20, 2010

(65) Prior Publication Data
US 2011/0216813 A1   Sep. 8, 2011

(51) Int. Cl.
*H04B 7/14* (2006.01)
(52) U.S. Cl.
USPC .......................................... 375/211; 375/346
(58) Field of Classification Search
USPC ................................................ 375/211, 346
See application file for complete search history.

(56) References Cited

U.S. PATENT DOCUMENTS

| | | | | |
|---|---|---|---|---|
| 6,320,920 B1 * | 11/2001 | Beyke | ............... | 375/350 |
| 7,313,199 B2 * | 12/2007 | Gupta et al. | ............... | 375/297 |
| 8,055,235 B1 * | 11/2011 | Gupta et al. | ............... | 455/296 |
| 2004/0142700 A1 * | 7/2004 | Marinier | ............... | 455/454 |
| 2007/0191071 A1 | 8/2007 | Spampinato et al. | | |
| 2013/0089009 A1 * | 4/2013 | Li et al. | ............... | 370/278 |
| 2013/0102254 A1 * | 4/2013 | Cyzs et al. | ............... | 455/63.1 |

FOREIGN PATENT DOCUMENTS

| | | |
|---|---|---|
| EP | 1261148 A1 | 11/2002 |
| JP | 2005223599 A | 8/2005 |

\* cited by examiner

*Primary Examiner* — Michael Neff
(74) *Attorney, Agent, or Firm* — Coats & Bennett, PLLC

(57) ABSTRACT

Method and arrangement in a relay node, for cancelling self-interference. The relay node is connected to one or more reception antennas, which reception antennas are configured to receive wireless signals. The method comprises receiving an analogue input signal, converting each received analogue input signal into a digital signal, processing the digital signal, extracting a cancellation signal from each respective digitally processed digital signal, combining and filtering the extracted cancellation signals into a number of combined cancellation signals, converting each combined cancellation signal into an analogue cancellation signal, and subtracting each analogue cancellation signal from the analogue input signal.

11 Claims, 5 Drawing Sheets

METHOD AND ARRANGEMENT IN A COMMUNICATION SYSTEM

TECHNICAL FIELD

The present invention relates to a method and an arrangement in a relay node comprised in a wireless communication system. In particular it relates to a mechanism for self interference cancellation within the relay node.

BACKGROUND

Long Term Evolution (LTE), also denoted evolved UTRAN (E-UTRAN), has been defined by the 3rd Generation Partnership Project (3GPP). One of the most important improvement areas in LTE-Advanced is the increase of data rates available for users at the cell edge.

A very promising technique to achieve this goal is the deployment of relays. Relays may broadly be classified into layer 1 relays, layer 2 relays, and layer 3 relays. Layer 1 relays, also known as repeaters do not decode the signal but generally just perform an amplify-and-forward operation. These repeaters only have Layer 1 user plane functionality.

Layer 2 relays demodulate the signal, and typically also perform forward error correction. Depending on the underlying physical layer this demodulation process introduces a non-negligible delay. In case of LTE-Advanced this delay is at least 1 ms and the repeated, delayed signal interferes with new transmissions. On the other hand, the demodulation process removes noise and forwards a "clean" signal. Layer 2 relays have in the user plane in addition to Layer 1 functionality, also Layer 2 functionality.

Layer 3 relays, in the context of LTE, have the same functionality as an eNodeB but the connection of the base station with the network is done via a wireless link using the LTE air interface. Therefore Layer 3 relays are also denoted wireless backhauls. Layer 3 relays may encompass routing functionality.

In LTE Release 8, but also in Wideband Code Division Multiple Access (WCDMA) and other wireless access technologies, Multiple Input Multiple Output (MIMO) is a fundamental concept to increase data rates through spatial multiplexing, also referred to as multilayer transmission. MIMO is further used in order to increase the diversity, i.e. the robustness, of the wireless link. In case of multilayer transmission multiple data streams are simultaneously transmitted over uncorrelated channels to increase the data rates, at least up to a certain degree. Uncorrelated channels are for example achieved for each polarization by separating the multiple transmit and receive antennas sufficiently in space at the transmitter and receiver, respectively. Another possibility is to use polarized antennas. The number of how many layers, i.e. spatial multiplexed streams that can be transmitted simultaneously over a MIMO channel is determined by the channel's rank. To be able to transmit N layers, at least N transmission and reception antennas are required. In order to exploit the sender and receiver antenna arrays optimally as well as to maintain uncorrelated channels even over a multi-hop link via a relay, it is required that the relays maintains the channel rank. In order to do so the relay needs at least as many receive and transmit antennas as the desired end-to-end channel rank. A relay equipped with an insufficient number of antennas collapses the channel and reduces the rank, which is known and denoted as a key-hole effect.

If the input and output antennas of a relay are not sufficiently isolated, then a certain part of the amplified output signals is received by the receive antennas and amplified even further. This effect is denoted self interference. In the worst case the system becomes instable and starts to oscillate. However, even in case the systems remains stable the requirement on the dynamic range of the Analog to Digital Converter (ADC) is increased since the input signal, which probably is rather weak, is interfered by the amplified output signal, which possibly is rather strong. In order to resolve the input signal, a higher resolution of the ADC is generally required.

In order to mitigate the self interference impact, so called self interference cancellation can be exploited.

In the classical approach, the cancellation is done completely in the digital domain. This approach may involve low hardware complexity and few components. Yet, this method dictates a potentially costly ADC with the sufficient resolution to handle the high dynamic range and speed to be used.

The existing method also present weakness when it comes to dynamic range handling, i.e. when the desired input signal may be weaker than the feedback signal to be cancelled. Also, undesired quantization noise of the feedback signal should be avoided.

A relay supporting MIMO transmissions has in the general case N transmit and M receive antennas. In case self interference cancellation is done in digital domain, M ADCs, one for each receive antenna, with high resolution are required.

In case the cancellation is performed in analogue domain, N·M feedback signals need to be cancelled since in total N·M channels exist between M receive and N transmit antennas. A natural approach for a person skilled in the art would hence be to use a Digital to Analogue Converter (DAC) for each signal to cancel. Even though the ADC thus may have a lower resolution, the cost for N·M DAC is substantial when the number of antennas increases.

It is thus a problem to avoid self-interference and at the same time avoiding increasing the costs involved.

SUMMARY

It is therefore an object of the present invention to provide an improved performance of a wireless communication system.

The object is achieved by a method in a relay node or a repeater node, here referred to as a relay node, for cancelling self-interference. The relay node is connected to one or more reception antennas. The reception antennas are configured to receive wireless signals. According to the present method, an analogue input signal is received from each respective reception antenna. The received analogue input signal is converted into a digital signal. When the signal is converted into a digital signal, it is digitally processed in a signal processing unit. A cancellation signal is then extracted from each respective digitally processed digital signal. The extracted cancellation signals are then combined with each other and filtered in a multi-input-single-output filter. The multi-input-single-output filter is comprised within the relay node. The cancellation signals are thus combined into a number corresponding to the number of reception antennas. This or these combined cancellation signal is then converted into an analogue cancellation signal. Each analogue cancellation signal is then subtracted from the corresponding analogue input signal.

The object is also achieved by an arrangement in a relay node for cancelling self-interference. The relay node is connected to one or more reception antennas. The reception antennas are configured to receive wireless signals. The arrangement comprises an RF receiver chain. The RF receiver chain is configured to receive an analogue input signal from each reception antenna. The arrangement also comprises a converter. The converter is configured to convert each received analogue input signal into a digital signal. The arrangement further comprises a signal processing unit. The signal processing unit is configured to digitally process the digital signal. In addition, the arrangement also comprises an extraction unit. The extraction unit is configured to extract a cancellation signal from each respective digitally processed digital signal. Still further, the arrangement comprises a multi-input-single-output filter. The multi-input-single-output filter is configured to combine the extracted cancellation signals into a number of combined cancellation signals. The number of combined cancellation signals corresponds to the number of reception antennas. Further, the arrangement additionally comprises yet a converter. The converter is configured to convert each combined cancellation signal into an analogue cancellation signal. The arrangement furthermore comprises a subtracting unit. The subtracting unit is configured to subtract each analogue cancellation signal from the corresponding analogue input signal.

By combining and filtering the extracted cancellation signals in a multi-input-single-output filter before conversion and subtraction, the number of digital to analogue converters in a MIMO relay with M receive antennas and N transmission antennas is reduced from M·N to M. The digital to analogue converter is further one of the most power greedy parts of a relay, why a reduced number of converters also result in reduced power consumption. Thus the cost and complexity involved when constructing a mechanism for self interference cancellation within a MIMO relay node is reduced, which brings an overall improved performance to the wireless communication system.

Other objects, advantages and novel features of the present invention will become apparent from the following detailed description of the invention.

BRIEF DESCRIPTION OF THE DRAWINGS

The present invention will now be described more in detail in relation to the enclosed drawings, in which.

DETAILED DESCRIPTION

The invention is defined as a method and an arrangement which may be put into practice in the embodiments described below. This invention may, however, be embodied in many different forms and should not be construed as limited to the embodiments set forth herein; rather, these embodiments are provided so that this disclosure will be thorough and complete, and will fully convey the scope of the invention to those skilled in the art. It should be understood that there is no intent to limit the present method or arrangement to any of the particular forms disclosed, but on the contrary, the present method and arrangement is to cover all modifications, equivalents, and alternatives falling within the scope of the invention as defined by the claims.

Figure 1:
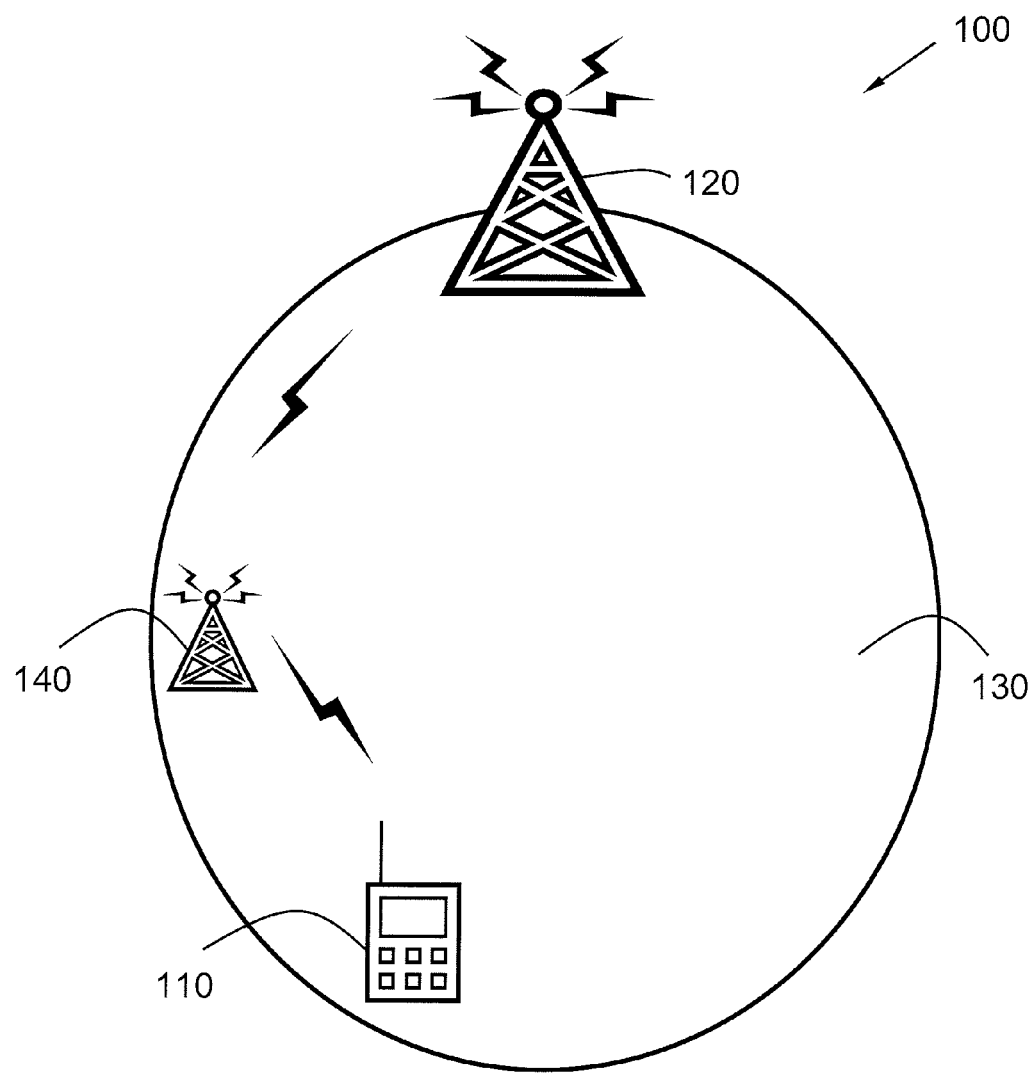
FIG. 1 is a schematic block diagram illustrating embodiments of a wireless communication system.

FIG. 1 depicts a wireless communication system 100 comprising a first node 110 communicating with a second node 120 in a cell 130. The distance and/or the radio propagation conditions within the cell 130 may preclude direct radio communication between the first node 110 and the second node 120. Thus the communication between the first node 110 and the second node 120 may be made via a relay node 140 comprised in the wireless communication system 100.

It will be appreciated that the number of components illustrated in FIG. 1 is purely exemplary. Other configurations with more, fewer, or a different arrangement of components may be implemented. Moreover, in some embodiments, one or more components in FIG. 1 may perform one or more of the tasks described as being performed by one or more other components in FIG. 1.

The wireless communication system 100 may also comprise a control node, according to some optional embodiments, depending on the technology used. The control node may be e.g. a Radio Network Controller (RNC). The control node may carry out radio resource management and some of the mobility management functions.

In some embodiments, the first node 110 may be represented by e.g. a wireless communication terminal, a mobile cellular telephone, user equipment (UE), a Personal Communications Systems terminal, a Personal Digital Assistant (PDA), a laptop, a computer or any other kind of device capable of operating on radio resources. A Personal Communication System terminal may combine a cellular radiotelephone with data processing, facsimile and data communications capabilities. A PDA may comprise a radiotelephone, a pager, an Internet/intranet access device, a web browser, an organizer, calendars etc.

The second node 120 may in some embodiments be referred to as e.g. a base station, an access point, a Node B, an evolved Node B (eNode B) and/or a base transceiver station, Access Point Base Station, base station router, etc depending e.g. of the radio access technology and terminology used.

The wireless communication system 100 may be based on technologies such as e.g. E-UTRAN, LTE, Code division multiple access (CDMA), Wideband Code Division Multiple Access (WCDMA), CDMA 2000, High Speed Downlink Packet Data Access (HSDPA), High Speed Uplink Packet Data Access (HSUPA), High Data Rate (HDR), TD-SCDMA, etc.

As a non limiting example only and for purely illustrative purpose this description is written with the invention embodied in an E-UTRAN environment. However, the present method and arrangement may as well be used also in other technology environments.

The relay node 140 may sometimes be referred to e.g. as a cellular repeater, a cell phone repeater, or a wireless cellular signal booster. The relay node 140 is adapted e.g. to boost the cell phone reception to the local area by the usage of inter alia a signal amplifier and an internal rebroadcast antenna. However, the relay node 140 may be adapted to amplify any received wireless signal and retransmit it.

Figure 2:
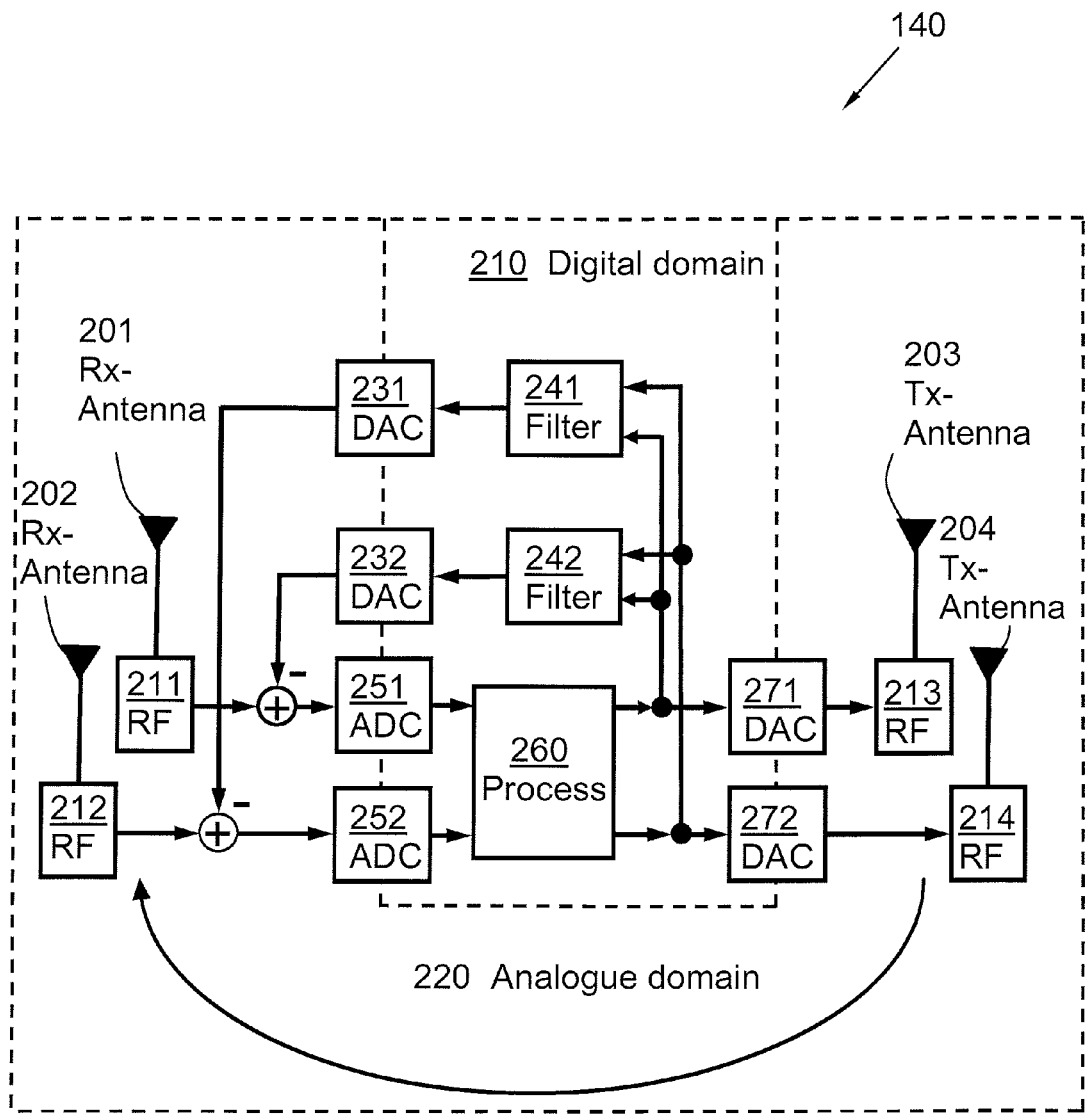
FIG. 2 is a block diagram illustrating embodiments of a relay node.

FIG. 2 illustrates a MIMO enabled relay node 140, with an applied self interference cancellation mechanism. In the non limiting example of embodiment illustrated in FIG. 2, the relay 140 comprises two reception antennas 201, 202 and two transmission antennas 203, 204. But the present method and arrangement may be applied to any MIMO or Single Input Multiple Output (SIMO) enabled relay node 140 connected to any arbitrary number of antennas. The interference is weighted in the digital domain 210 and cancelled in the analogue domain 220 after having converted the cancellation signals into analogue signals by letting the cancellation signals pass two DACs 231, 232 according to some embodiments. Further, the relay node 140 comprises RF parts 211, 212, which receives analogue signals from the reception antennas 201, 202.

A conversion of cancellation signals with a reduced number of converters 231, 232 is achieved if, instead of subtracting all individual interfering signals in the analogue domain, the cancellation signals are firstly weighted together in filters 241, 242 to form M signals in the digital domain 210 and then through the DAC 231, 232 converted to the analogue domain 220 subtracted from the input signals, prior the ADCs 251, 252. The number of weighted cancellation signals M is equal as the number of reception antennas 201, 202. Number of reception antennas 201, 202 is here understood as the number of reception antenna port connectors 201, 202. For example, several antenna elements may comprise one reception antenna connected to one antenna port.

The input signal is received by one or more reception antennas 201, 202. After the subtraction of the cancellation signals, the input signals are converted to digital signals by the ADCs 251, 252. The digital signal may then be digitally processed, e.g. amplified, in the signal processing unit 260. The digitally processed signals are then converted to analogue signals by the DACs 271, 272 and the cancellation signals are sent to the filters 241, 242 as previously described. Finally the digitally processed analogue signal may be forwarded via the RF parts 213, 214 and transmitted by the transmission antennas 203, 204.

In analogy to the definition of number of reception antennas 201, 202, the number of transmission antennas 203, 204 means the number of transmission antenna ports 203, 204. For example, several antenna elements may comprise one transmission antenna connected to one antenna port.

Typically the extraction unit extracts one cancellation signal per reception antenna 201, 202. However, in certain arrangements the relay may be equipped with more reception antennas 201, 202 than MIMO data streams transmitted. In such cases it may be sufficient to extract one cancellation signal per data stream. Further, the extraction unit may utilize knowledge of the DAC 271, 272 and subsequent elements of the transmission path when calculating the extraction signals.

Figure 3:
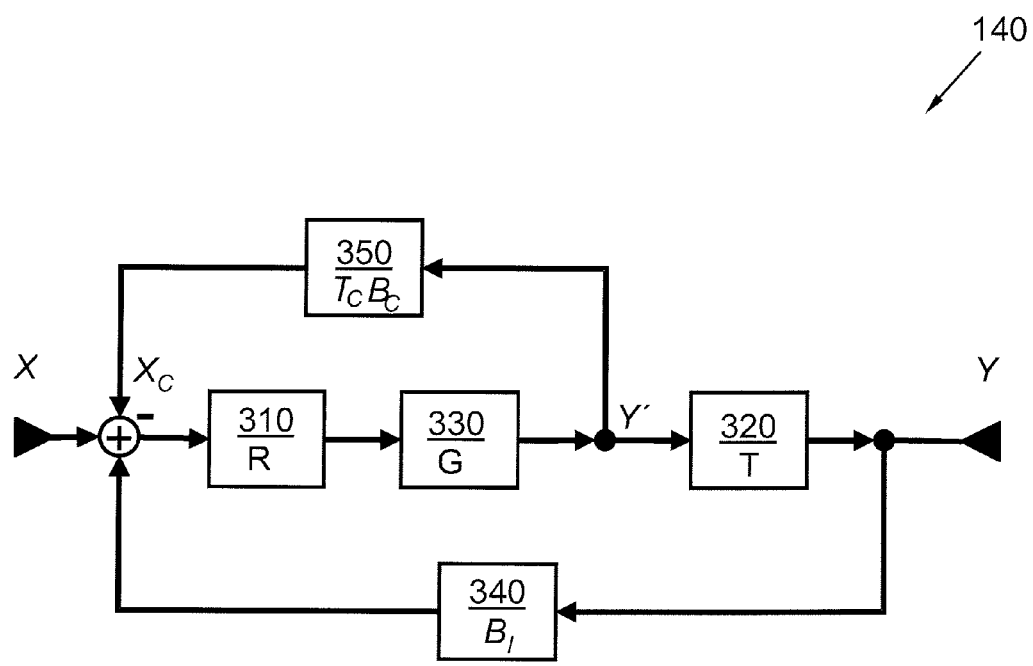
FIG. 3 is a block diagram illustrating embodiments of a relay.

FIG. 3 is a schematic block diagram of the MIMO enabled relay 140, with an applied self interference cancellation mechanism. FIG. 3 thus illustrates the same relay 140 as previously depicted in FIG. 2 but wherein all blocks are described by matrices of transfer functions.

The R-block 310 describes any non-ideal behaviour that the signal are subjected to when entering the relay 140, e.g. antenna coupling, radio frequency imperfections, linear imperfections of the ADC, etc. The T-block 320 describes similar effects at the output of the relay 140. These two blocks 310, 320 vanish in the ideal case. For MIMO relays 140 this implies $R=I_M$ and $T=I_N$ with $I_M$ and $I_N$ denoting the M×M and N×N identity matrix, respectively.

The G-block 330 describes the actual relay function. Functionality included in the G-block 330 may be for example amplification and receive and transmit beamforming.

Beamforming is a signal processing technique used in sensor arrays for directional signal transmission or reception. This spatial selectivity is achieved by using adaptive or fixed receive/transmit beampattern. The improvement compared with an omnidirectional reception/transmission is known as the receive/transmit gain.

The interference, or (undesired) feedback between transmission antennas 203, 204 and reception antennas 201, 202 is described by the M×N $B_I$-matrix 340. Each transmission antenna 203, 204 couples to each reception antenna 201, 202 and the coupling function between transmission antenna n 203, 204 and reception antenna m 201, 202 is described by the element $[B_I]_{m,n}$.

The self interference cancellation scheme is described by M×N $(T_C \cdot B_C)$-matrix 350. The feedback loop via the $(T_C \cdot B_C)$-matrix 350 may mimic the feedback via the $B_I$-matrix 340, together with the T-block 320 as close as possible to cancel the self interference.

The transfer function $T_C$ describes the behaviour of the DAC 231, 232 and since identical converters are assumed they can all be described by the same transfer function $T_C$. The $(T_C \cdot [B_C]_{m,n})$-element 350 may cancel the self-interference between the nth transmission antenna to the mth reception antenna.

When inspecting the function performed in the $(T_C \cdot [B_C]_{m,n})$-block 350 closer, the feedback signal $X_C$ which is to be subtracted from the input antenna port may be expressed as:

$$[X_C]_m \sum_{n=0}^{N-1} T_C \cdot [B_C]_{m,n} \cdot [Y']_n$$

This expression may be simplified to:

$$[X_C]_m = T_C \cdot \sum_{n=0}^{N-1} [B_C]_{m,n} \cdot [Y']_n$$

Since the transfer function $T_C$ does not depend on the index n of the transmission antenna. Above equation states that signals $[Y']_m$ feed into the self interference cancellation circuitry may first be digitally combined and the output of this combining process may be applied to a single DAC 231, 232 per reception antenna.

Figure 4:
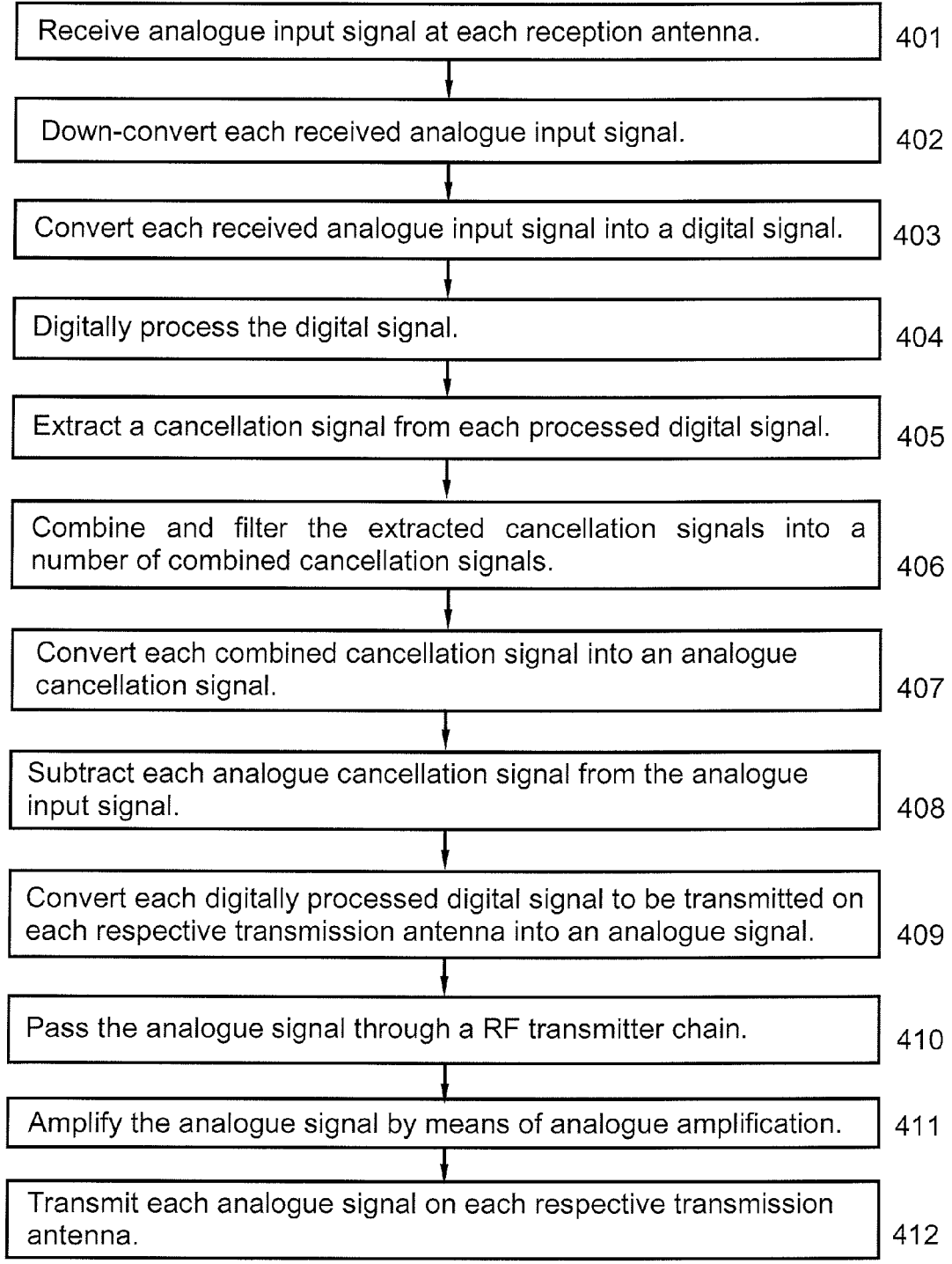
FIG. 4 is a flow chart illustrating embodiments of method steps in a relay node.

FIG. 4 is a flow chart illustrating embodiments of method steps 401-412 performed in a relay node or repeater node 140. The node 140 will continuously be referred to as a "relay node". The method aims at cancelling, or at least somewhat reducing, self-interference. The relay node 140 is connected to one or more reception antennas 201, 202. The reception antennas 201, 202 are configured to receive wireless signals.

The relay node 140 may, according to some optional embodiments be connected to one single antenna 203, 204, or to a plurality of transmission antennas 203, 204, which transmission antennas 203, 204 are configured to transmit wireless signals.

To appropriately cancel out self-interference, the method may comprise a number of method steps 401-412. It is however to be noted that some of the described method steps are optional and only comprised within some embodiments. Further, it is to be noted that the method steps 401-412 may be performed in any arbitrary chronological order and that some of them, e.g. step 405 and step 409, or even all steps may be performed simultaneously or in an altered, arbitrarily rearranged, decomposed or even completely reversed chronological order. The method may comprise the following steps:

Step 401

An analogue input signal is received from each respective reception antenna 201, 202.

Step 402

This step is optional and may only be comprised within some embodiments of the present method.

Figure 5:
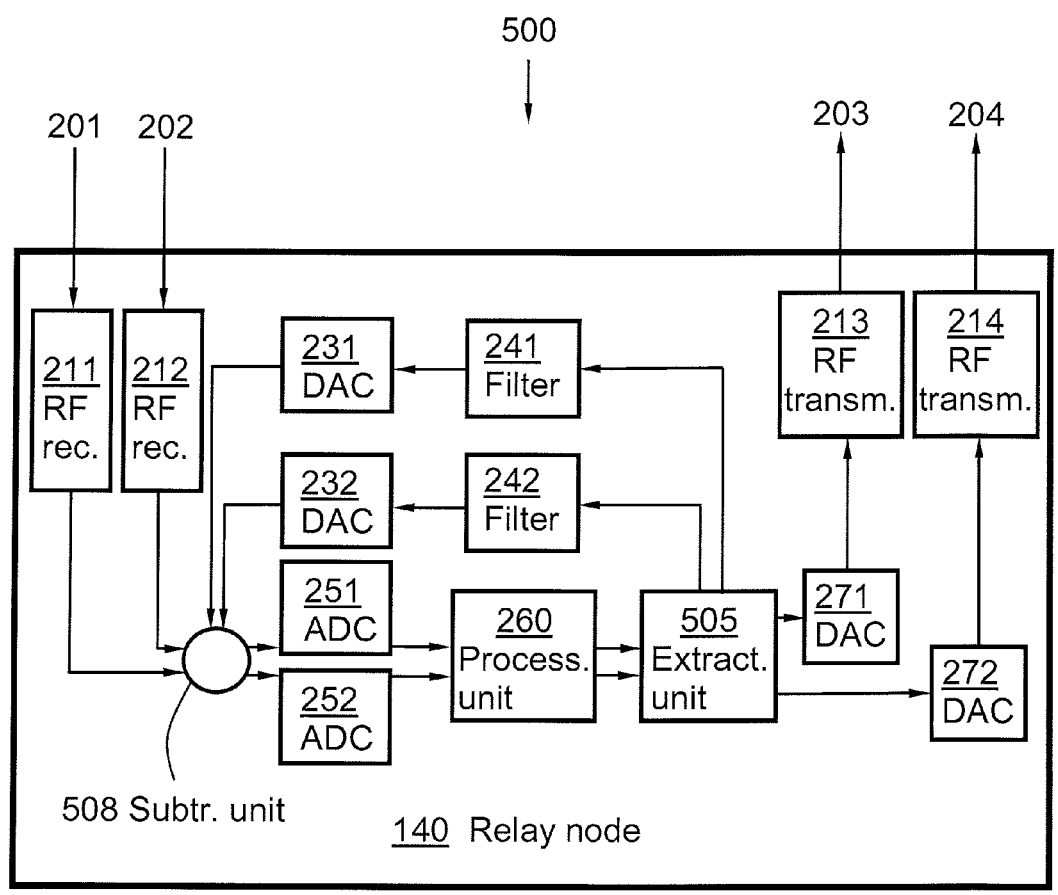
FIG. 5 is a block diagram illustrating embodiments of an arrangement in a relay node.

In this step each received analogue input signal may be down-converted in a Radio Frequency (RF) receiver chain 211, 212, which receiver chain 211, 212 will be further described in relation to FIG. 5. The RF receiver chain 211, 212 may be comprised within the relay node 140.

Step 403

Each received analogue input signal is converted into a digital signal.

Step 404

The digital signal is digitally processed in a signal processing unit 260. According to some embodiments, the digital processing may comprise amplification of the digital signal.

Step 405

A cancellation signal is extracted from each respective digitally processed digital signal.

Step 406

The extracted cancellation signals are combined and filtered in a multi-input-single-output filter 241, 242 comprised within the relay node 140. Thus the cancellation signals are combined into a number of combined cancellation signals, which number corresponds to the number of reception antennas 201, 202.

Step 407

Each combined cancellation signal is then converted into an analogue cancellation signal.

Step 408

Each analogue cancellation signal is subtracted from the analogue input signal. According to some optional embodiments, each analogue cancellation signal is subtracted from the down-converted analogue signal.

Step 409

In this step each digitally processed digital signal to be transmitted on each respective transmission antenna 203, 204 may be converted into an analogue signal by means of a digital to analogue converter 271, 272, according to some embodiments.

Step 410

This step is also optional and may only be comprised within some embodiments of the present method. The analogue signal may be passed through a RF transmitter chain 213, 214, according to some embodiments. This step may further comprise amplification of the analogue signal.

Step 411

This step is optional and may only be comprised within some embodiments of the present method. The analogue signal may be amplified by means of analogue amplification.

Step 412

Each analogue signal may be transmitted on each respective transmission antenna 203, 204, according to some embodiments. The analogue signal may be transmitted over a continuous and attenuating radio channel that at least partially interferes with the analogue input signals.

FIG. 5 is a block diagram illustrating embodiments of an arrangement 500 situated in the relay node or a repeater node 140, here referred to as "relay node" 140. The arrangement 500 is configured to perform the method steps 401-412 for cancelling self-interference. The relay node 140 is connected to one or more reception antennas 201, 202. The reception antennas 201, 202 are configured to receive wireless signals.

The arrangement 500 comprises RF receiver chains 211, 212. The RF receiver chains 211, 212 are configured to receive analogue input signals from each reception antenna 201, 202. According to some embodiments, the RF receiver chains 211, 212 may be further configured to down-convert each received analogue input signal.

The arrangement 500 also comprises converters 251, 252, e.g. Analogue to Digital Converters. The converters 251, 252 are configured to convert each received analogue input signal into a digital signal.

Further, the arrangement 500 comprises a signal processing unit 260. The signal processing unit 260 is configured to digitally process the digital signal.

Further yet, the arrangement 500 comprises an extraction unit 505. The extraction unit 505 is configured to extract a cancellation signal from each respective digitally processed digital signal.

In addition, the arrangement 500 comprises a multi-input-single-output filter 241, 242. Each multi-input/single-output filter 241, 242 is adapted to receiving a plurality of extracted cancellation signals, e.g. two signals and outputs one combined cancellation signal. The multi-input-single-output filter 241, 242 is configured to combine the extracted cancellation signals into a number of combined cancellation signals, which number corresponds to the number of reception antennas 201, 202.

The multi-input-single-output filter 241, 242 may further be configured to decrease unnecessary frequency components of the extracted cancellation signals, according to some embodiments.

Still further, the arrangement 500 comprises a converter 231, 232 such as e.g. a Digital to Analogue Converter. The converter 231, 232 is configured to convert each combined cancellation signal into an analogue cancellation signal.

Additionally, the arrangement 500 comprises a subtracting unit 508. The subtracting unit 508 is configured to subtract each analogue cancellation signal from the corresponding analogue input signal.

According to some optional embodiments, the arrangement 500 may further comprise RF receiver chains 211, 212. The RF receiver chains 211, 212 may in turn comprise a number of components and/or units, such as e.g. mixer, converter, amplifiers such as e.g. low noise amplifiers, variable gain amplifiers and/or other circuits.

The arrangement 500 further comprises transmitting parts 213, 214, sometimes also referred to as RF transmitter chains 213, 214. The transmitting part 213, 214 is configured to transmit each analogue signal on each respective transmission antenna 203, 204. According to some optional embodiments, the RF transmitter chains 213, 214 may in turn comprise a number of components and/or units, such as e.g. converter, filter, mixer, gain control circuit and/or power amplifier. The RF transmitter chains 213, 214 may be adapted for up-conversion to the transmitted frequency and/or adjusting the output power of the RF transmitter chains 213, 214 to a desired level.

The transmitting part 213, 214 may according to some embodiments comprise an amplifying unit.

For the sake of clarity, any internal electronics of the arrangement 500, not entirely necessary for performing the present method has been omitted from FIG. 5.

It is to be noted that the described units 201-508 comprised within the arrangement 500 are to be regarded as separate logical entities but not with necessity separate physical entities. Any, some or all of the units 201-508 may be comprised or co-arranged within the same physical unit. However, in order to facilitate the understanding of the functionality of the arrangement 500, the comprised units 201-508 are illustrated as separate physical units in FIG. 5.

The method in the relay node 140 for cancelling self-interference may be implemented through one or more processors in the relay node 140, together with computer program code for performing the functions of the method. The program code mentioned above may also be provided as a computer program product, for instance in the form of a data carrier carrying computer program code for performing the method according to the present invention when being loaded into the processing unit. The data carrier may be a CD ROM disc, a memory stick, or any other appropriate medium such as a disk or tape that can hold machine readable data. The computer program code can furthermore be provided as program code on a server and downloaded to the relay node 140 remotely.

Thus a computer program comprising instruction sets for performing the method according to at least some of the method steps 401-412 may be used for implementing the previously described method.

The present invention may be embodied as an arrangement 500 within a relay node 140, a method in a relay node 140 or a computer program product. Accordingly, the present invention may take the form of an entirely hardware embodiment, or an embodiment combining software and hardware aspects all generally referred to herein as a "circuit".

The terminology used in the detailed description of the particular exemplary embodiments illustrated in the accompanying drawings is not intended to be limiting of the invention.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The invention claimed is:

1. A method in a relay node for cancelling self-interference, wherein the relay node is connected to at least two reception antennas that are each configured to receive wireless signals, the method comprises:
   receiving an analogue input signal from each respective reception antenna,
   converting each received analogue input signal into a digital signal,
   digitally processing each digital signal in a signal processing unit,
   extracting a respective digital cancellation signal from each respective digitally processed digital signal,
   combining and filtering the extracted digital cancellation signals in respective multi-input-single-output filters comprised within the relay node, to produce a number of combined digital cancellation signals, wherein said number corresponds to a number of said at least two reception antennas,
   converting each combined digital cancellation signal into an analogue cancellation signal, and
   subtracting each analogue cancellation signal from the corresponding analogue input signal to obtain a respective corrected analogue input signal, which in turn is converted into a digital signal.

2. The method according to claim 1, further comprising down-converting each received analogue input signal in an RF receiver chain, and wherein said subtracting comprises subtracting each analogue cancellation signal from the corresponding down-converted analogue signal.

3. The method according to claim 1, wherein digitally processing each digital signal comprises amplifying each digital signal.

4. The method according to claim 1, wherein the relay node is connected to a plurality of transmission antennas that are each configured to transmit wireless signals, and wherein the method further comprises:
   converting each respective digitally processed digital signal into a respective analogue signal, using a digital to analogue converter, to be transmitted on each respective transmission antenna, and
   transmitting each analogue signal on a respective transmission antenna.

5. The method according to claim 4, further comprising passing each analogue signal through a respective RF transmitter chain.

6. The method according to claim 4, further comprising amplifying the analogue signal using analogue amplification.

7. The method according to claim 4, wherein transmitting each analogue signal comprises transmitting the signals over a continuous and attenuating radio channel that at least partially interferes with the analogue input signals.

8. A relay node configured to cancel self-interference and connected to at least two reception antennas that are configured to receive wireless signals, the relay node comprising:
   at least two Radio Frequency receiver chains each configured to receive an analogue input signal from a respective reception antenna,
   at least two first converters each configured to convert a respective received analogue input signal into a digital signal,
   a signal processing circuit configured to digitally process each digital signal,
   an extraction circuit configured to extract a respective digital cancellation signal from each respective digitally processed digital signal,
   at least two multi-input-single-output filters each configured to combine the extracted digital cancellation signals to produce a respective combined digital cancellation signal, the number of combined digital cancellation signals corresponding to a number of said at least two reception antennas,
   at least two second converters each configured to convert a respective combined digital cancellation signal into a corresponding analogue cancellation signal; and
   a subtracting circuit configured to subtract each analogue cancellation signal from the corresponding analogue input signal, to obtain a respective corrected analogue input signal, which in turn is converted into a digital signal.

9. The relay node according to claim 8, wherein the relay node is further connected to at least two transmission antennas, and further comprises:
   at least two third converters each configured to covert a respective digitally processed digital signal into a respective analogue signal, to be transmitted on each respective transmission antenna, and
   a transmitting part configured to transmit each analogue signal on a respective transmission antenna.

10. The relay node according to claim 9, wherein the transmitting part comprises at least two RF transmitter chains.

11. The relay node according to claim 9, wherein the transmitting part comprises at least two amplifying units.

* * * * *